Nov. 27, 1934.    O. WERNER    1,982,240
WEED CUTTER IN CONNECTION WITH POTATO DIGGERS
Filed March 14, 1933
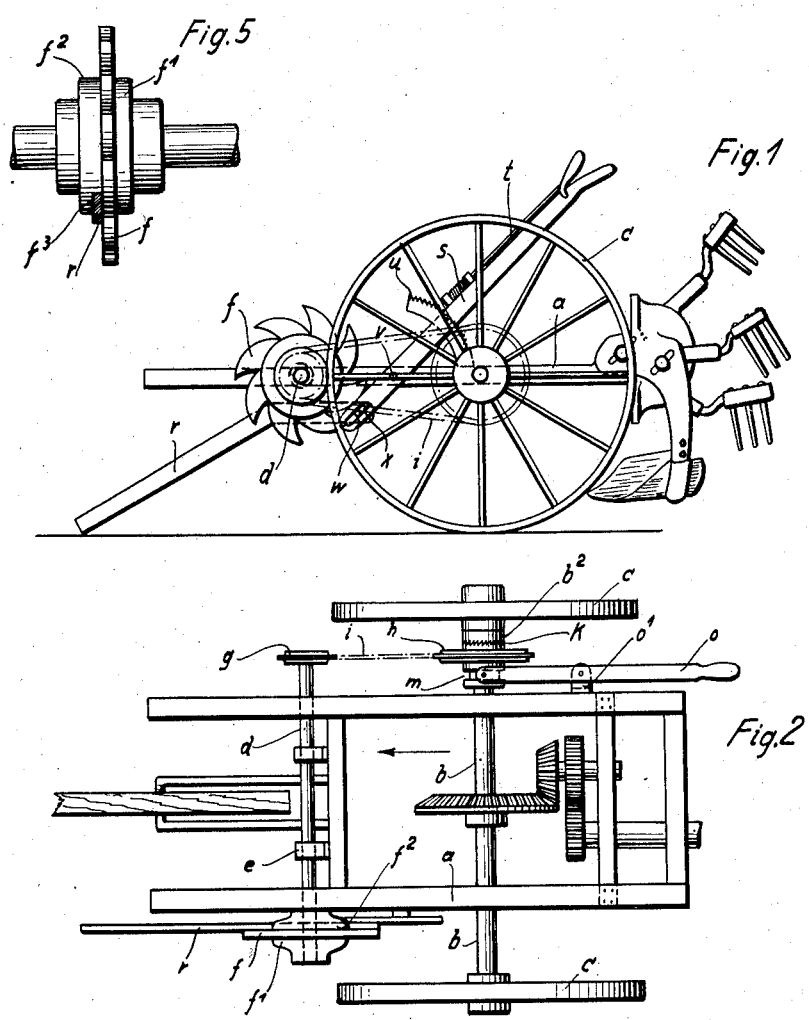
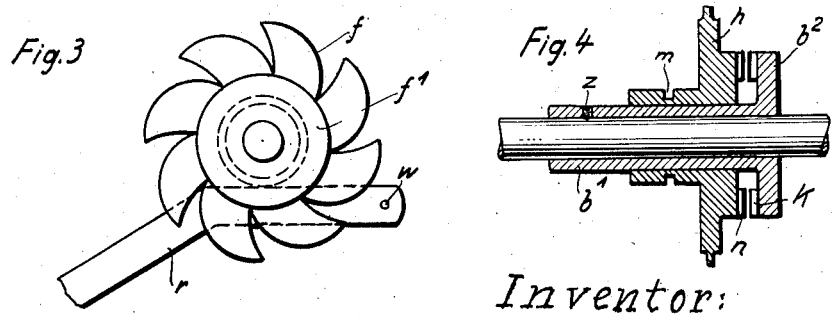
Inventor:

Patented Nov. 27, 1934

1,982,240

UNITED STATES PATENT OFFICE 1,982,240

WEED-CUTTER IN CONNECTION WITH POTATO-DIGGERS

Oswald Werner, Muschwitz, Germany

Application March 14, 1933, Serial No. 660,692
In Germany February 10, 1933

3 Claims. (Cl. 55—64)

My invention has relation to improvements in potato-diggers, and the main object of the invention is to provide a potato-digger of conventional type with means for cutting the stalks of potatoes and weeds as the machine is drawn over the field, and thus to prevent stalks and weeds from being gripped by the rotary fork and getting wound around the fork members, thereby rendering working of the machine most difficult.

Another object of the invention consists in providing means for lifting and holding in upright position the stalks of potatoes and weeds so as to bring them within reach of the rotary cutting device, mounted on the machine frame in the forward part thereof. A further object of the invention is to provide means for normally holding the rotary cutting device in operative engagement with a driving mechanism, and to provide means for bringing it out of engagement with said driving mechanism, as the case may be. A still further object of the invention is to provide a device of the character described which is composed of a relatively few parts, is therefore simple in construction, and is cheap to manufacture.

With these and other objects in view, the invention consists in the construction and novel combination of parts, hereinafter fully described, illustrated in the accompanying drawing and pointed out in the claims hereto appended, it being understood that various changes in the form, proportion, size and minor details of construction within the scope of the claims may be resorted to without departing from the spirit or sacrificing any of the advantages of the invention.

In the drawing:

Fig. 1 is a side elevation of a potato-digger of conventional type, provided with my improved weed cutting device;

Fig. 2 is a top plan view thereof;

Fig. 3 is a side elevation, on a larger scale, of the cutting device, and of the lever intended for forking the weeds;

Fig. 4 is a detail sectional view showing the means for coupling and uncoupling the driving mechanism, and Fig. 5 is a front elevation of the cutting device, the lever being shown in section.

Referring to the drawing, and more particularly to Figs. 1 and 2 thereof, the frame structure $a$ of the potato-digger comprises a main shaft $b$, on which the wheels $c$ are journaled, the said wheels being designed to drive in the usual manner the mechanism for the digging elements, both being of conventional type. At the forward end of the frame $a$, there is located, in front of the main transverse shaft $b$ and substantially parallel thereto, a shaft $d$, and for supporting said shaft $d$, I provide bearings in the material of the frame bars, and intermediate these bars, I provide additional, forwardly-extending bearings, as indicated by the reference character $e$. The said shaft $d$ carries, at the left-hand side and at the outwardly projecting end thereof, a disk $f^1$, said disk having firmly mounted on its periphery, a plurality of spaced cutting knives, as at $f$, having forwardly-curved shape and preferably sharp edges. I may provide any suitable mechanism for rotating the shaft $d$ and the disk with its cutting knives, but preferably this mechanism comprises a sprocket-wheel $g$ secured on the shaft $d$ at the right-hand extremity thereof and connected with another sprocket-wheel $h$ by which it is driven through the medium of a chain $i$. The sprocket-wheel $h$ is journaled on a sleeve carried by the main shaft $b$ and adapted for lateral displacement on said sleeve. The said sleeve $b^1$ has a flanged end portion $b^2$, which is in close proximity to the sprocket-wheel $h$, as clearly shown in Figure 4. The said flanged portion $b^2$ carries at its inwardly directed face a toothed rim $k$, the teeth of which have a chamfered structure, and the outwardly directed face of the hub of said sprocket-wheel $h$ is provided with a toothed rim $n$ corresponding in shape to that belonging to the flanged portion $b^2$. Both toothed rims constitute clutch-couplings and are revolved by the shaft $b$ when thrown into gear, the said shaft thus imparting rotary motion to the sprocket-wheel $h$. The slidably mounted sprocket-wheel $h$ is controlled by a hand-lever $o$ pivoted to an arm $o^1$ fastened to the machine frame, and in the hub of said sprocket-wheel, there is provided a groove $m$ with which the inner extremity of said hand-lever is made to engage. The clutch $n$ on the sprocket-wheel $h$ engages the clutch $k$ on the flanged portion $b^2$ when the hand-lever $o$ is operated to throw them into gear, and, reversely, they are brought out of gear, when the lever is thrown in the opposite direction. The sleeve $b^1$ may be firmly connected to the main shaft $b$ by any suitable means; in the present instance, the connection is obtained by a screw $z$.

On the shaft $d$ is pivotally mounted a bracket or lever $r$, this lever being arranged in close proximity to the cutting-disk $f$, $f^1$ and disposed in a forwardly hanging position so as to reach down to the ground. The arrangement is made so that a flange $f^2$ carried by the shaft $d$ and lying close to the disk $f^1$, is provided with a cut out portion $f^3$ having right-angled shape, this cut out portion being intended for the firm reception of said lever $r$, as shown in Figure 5. The lever or bracket $r$ which may be secured to the flange $f^2$ in any suitable manner, for instance by welding, riveting, or the like, is, together with said flange $f^2$, adapted to pivot about said shaft $d$. The latter is in connection with an operating hand-lever $s$ engaging a semi-circular tooth-rack $u$ by means of a spring-controlled locking device $t$, adapted for adjustment of the lever $r$ in different inclined positions, or entirely raising said lever as the case may be. The hand-lever $s$ is pivoted to a bolt $v$, and its connection with the lever or bracket $r$ is obtained by means of a bolt $w$ carried by said bracket and engaging a slot $x$ made in the extremity of said hand-lever, in which slot the said bolt $w$ is adapted for displacement when said hand-lever is being operated.

In operation: After the clutches $k$, $n$ have been thrown into gear by the actuation of the hand-lever $o$, and the bracket $r$ has been given the position required, the said bracket, on the machine being moved along and the wheels $c$ rotated, lifts the stalks of potatoes and weeds and, holding them in upright position, brings them within reach of the rotary disk-knives $f$ which cut off said stalks and weeds. As said bracket occupies an inclined position, the weeds cut off fall immediately to the ground sideways. After completion of the digging operation, the clutches $k$, $n$ are thrown out of gear by the hand-lever $o$ being thrown in the opposite direction.

It is still to be noticed that a chain tightener of usual type may be provided in connection with the chain drive $i$, and that, further, all movable parts of the machine, such as the rotary cutting device, the chain drive and the clutches, may be protected by a guard, not shown in the drawing.

I claim:

1. A weed-cutter in connection with a potato-digger of conventional type, having a machine frame and a transverse main shaft rotated by the wheels of the machine, comprising a second shaft disposed in bearings at the forward part of the machine frame, a cutting device keyed to the said shaft on the left-hand, outwardly projecting end thereof, said cutting device comprising a disk and a plurality of forwardly-curved cutting knives mounted on the periphery of said disk, means for imparting rotary motion to said shaft and said disk-knives, this means comprising a sprocket-wheel keyed to the right-hand, outwardly projecting extremity of said second shaft, another sprocket-wheel slidably mounted on a sleeve carried by the main shaft of the machine, a chain connecting both said sprocket-wheels with each other, means for coupling said slidably-mounted sprocket-wheel with the revolving main shaft, a bracket pivotally mounted at the forward part of the machine and having an inclined, hanging position, a hand lever for operating said bracket and adjusting it in elevated positions above the ground, the said bracket co-operating with said cutting device, being adapted to lift the weeds, to hold them in upright position and to bring them within reach of the rotary cutting device.

2. A weed cutter in connection with a potato-digger of conventional type, having a machine frame and a transverse main shaft rotated by the wheels of the machine, comprising a second shaft disposed in bearings at the forward part of the machine frame, a cutting device keyed to said shaft on the left hand, outwardly projecting end thereof, said cutting device comprising a disk and a plurality of forwardly-curved, cutting knives mounted on the periphery of said disk, means including a clutch for transmitting rotary motion from the main shaft to the second shaft and disk-knives, a bracket disposed at the forward part of the machine and occupying an inclined, hanging position reaching down to the ground, a flanged member carried by said second shaft and disposed close to said cutting disk, a cut out portion in said flanged member adapted for securing therein said bracket, a pivotally mounted hand-lever in connection with said bracket for adjustment of the bracket in different elevated positions, the said bracket cooperating with the cutting device in such a manner as to lift the weeds and to bring them in upright position within reach of the rotary cutting device.

3. A weed-cutter in connection with a potato-digger of conventional type, having a machine frame and a transverse main shaft rotated by the wheels of the machine, a pivotally mounted weed lifter and means for operating said lifter, a cutting device carried by a second shaft of the frame, and a mechanism for transmitting rotary movement to said second shaft, such lifting member having the structure of a bracket and occupying an inclined, hanging position reaching down to the ground, said bracket being designed to lift weeds up to within reach of the said cutting device, and aiding in shearing said weeds.

OSWALD WERNER.